Dec. 20, 1966     D. R. M. LAMBERT ET AL     3,292,259
APPARATUS FOR SEPARATING CHEESE CURD AND WHEY
Filed Oct. 15, 1964     4 Sheets-Sheet 1

FIG. I

INVENTORS
DOUGLAS R.M. LAMBERT
JOSEPH M. SHARKEY
BY Anderson, Luedeka, Fitch, Even & Tabin
ATTORNEYS INVENTORS
DOUGLAS R. M. LAMBERT
JOSEPH M. SHARKEY
BY Anderson, Luedeka, Fitch, Even & Tabin
ATTORNEYS Dec. 20, 1966    D. R. M. LAMBERT ET AL    3,292,259
APPARATUS FOR SEPARATING CHEESE CURD AND WHEY
Filed Oct. 15, 1964    4 Sheets-Sheet 4
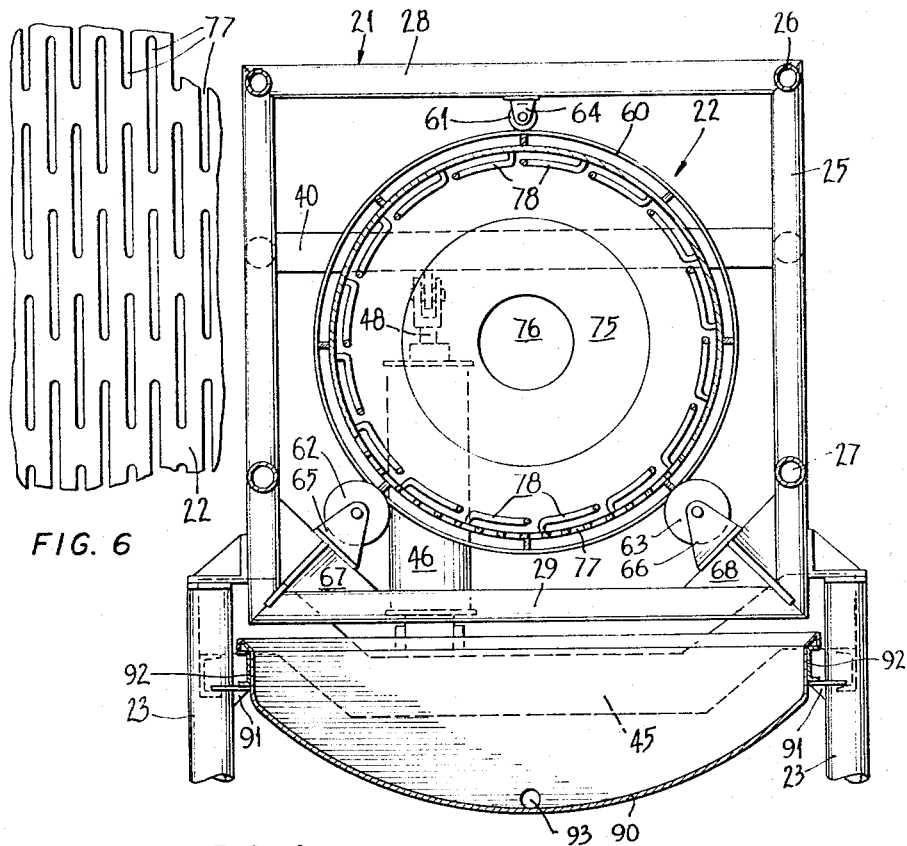
FIG. 6
FIG. 4
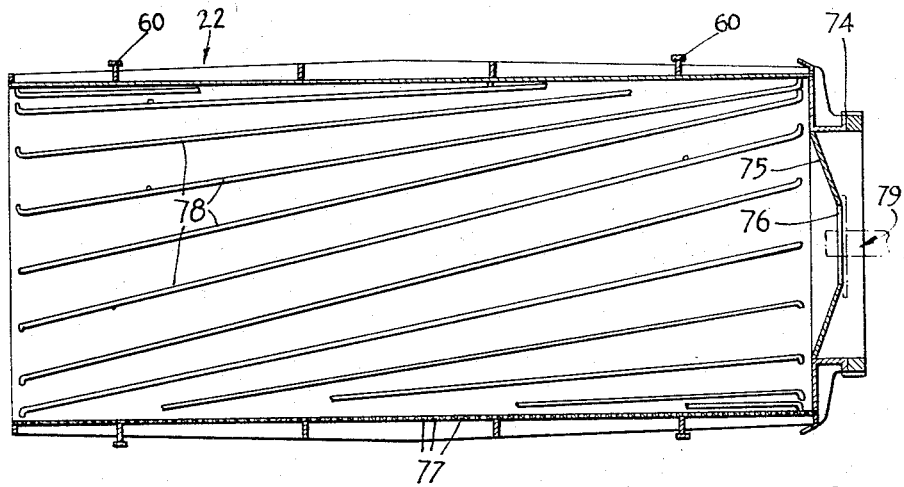
FIG. 5
INVENTORS
DOUGLAS R.M. LAMBERT
JOSEPH M. SHARKEY
BY Anderson, Luedeka, Fitch, Even & Tabin
ATTORNEYS

United States Patent Office 3,292,259
Patented Dec. 20, 1966

3,292,259
APPARATUS FOR SEPARATING CHEESE CURD AND WHEY
Douglas R. M. Lambert, Caulfield, Victoria, and Joseph M. Sharkey, Box Hill, Victoria, both of Australia, assignors, by mesne assignments, to National Dairy Products Corporation, New York, N.Y., a corporation of Delaware
Filed Oct. 15, 1964, Ser. No. 404,003
Claims priority, application Australia, Aug. 14, 1964, 48,142/64
3 Claims. (Cl. 31—48)

This invention relates to an apparatus for separating whey from curd in the manufacture of cheese, and is concerned particularly with that stage in the process of cheese making wherein a mixture of curd granules or particles and whey has been removed from the cheese vats in which the curd was formed and cooked and is subjected to a separation treatment to substantially remove the whey from the curd granules.

A principal object of this invention is to provide an apparatus for the handling of a mixture of cheese curd and whey in order to effect an improved separation of whey from the cheese curd. Another object of this invention is to provide an apparatus which enables whey to be efficiently and rapidly separated from cheese curd without harm to the curd.

According to one form of the invention, apparatus of the kind described comprises a tiltable rotatable trommel or drum having less than one-half of its surface provided with elongated, circumferentially extending slots.

Preferably, the trommel is cylindrical in shape and is provided with slots in a generally axial segment extending over approximately one-third of its surface. The segment is generally axially extending, that is, the segment containing the slots extends from end to end of the trommel and over one-third of its circumference, the remainder of the trommel being imperforate. The elongated slots have a width sufficient to permit whey to drain through, but not sufficient to allow curd granules to pass through or to block up the slots. Of course, a small proportion of fines may pass through these slots. Preferably the width of each slot is less than the minimum dimension of the curd granules, other than fines. The length of each slot is several times greater than the width of the slots. The slots are preferably arranged in rows spaced axially from one another, the slots in each row being preferably opposite to the spaces between the slots in the adjacent rows.

The shape of the slots is important to minimize harm to the curd, particularly during rotation of the trommel. The elongated shape not only minimizes harm to the curd when the slots extend circumferentially, but they also permit improved drainage of whey. Also, the limited area and positioning of the area has been found to give improved results in the manufacture of cheese by limiitng drainage of the curd to a certain sector of the trommel.

The ends of the trommel are partially closed to enable the curd and whey to be retained in the trommel during the separation operation. Means are provided for delivering a mixture of curd granules and whey to one end of the trommel, and means are also provided for tilting the trommel in order to discharge curd granules from the other end of the trommel after the separation operation has been completed.

The trommel is provided internally with lifting members, which preferably comprise spaced apart parallel rods which are disposed to extend helically from end to end of the trommel and are secured to the internal surface of the trommel so as to be spaced a short distance inwardly therefrom. The rods serve to lift the curd as the trommel rotates and facilitate the separation of curd and whey and the drainage of the latter through the slots. Fingers or projections may be provided on some of the rods, for example on every third rod, to assist in preventing the formation of lumps or large aggregations of curd.

A tray is provided beneath the trommel to collect the whey which drains through the slots.

The trommel is rotated by suitable mechanism according to a predetermined cycle, both during and after the delivery of the mixture of curd and whey to the trommel. Means are provided to vary the speed of rotation of the trommel, which is preferably rotatable at either a low speed or a higher speed, as required. The cycle of turning operations of the trommel is varied according to the condition of the curd and whey mixture supplied to the trommel, and in one embodiment may comprise (1) four complete revolutions at low speed during the delivery of the mixture of curd and whey to the trommel, the trommel being held with the imperforate segment at the lowermost position for a period between successive revolutions, (2) a one-half revolution of the trommel whereby the perforate segment thereof is brought to the lowermost position, followed by a draining period of one minute while the drum is stationary with the perforations in a position to permit drainage, (3) one complete revolution followed by one minute drainage period with drum stationary, (4) one complete revolution followed by one minute drainage period with drum stationary, (5) continuous rotation of the trommel at high speed with the trommel in tilted position while curd granules are being discharged from the trommel.

Other objects and features of the invention will become apparent from the ensuing description of the form of the invention illustrated in the accompanying drawings, wherein:

FIGURE 4 is a view in sectional and elevation taken on the line 4—4 of FIGURE 1;

FIGURE 5 is a view in sectional elevation of the trommel; and

FIGURE 6 is a view to an enlarged scale of portion of the perforate section of the peripheral wall of the trommel, showing the slots therein.

Figure 1:
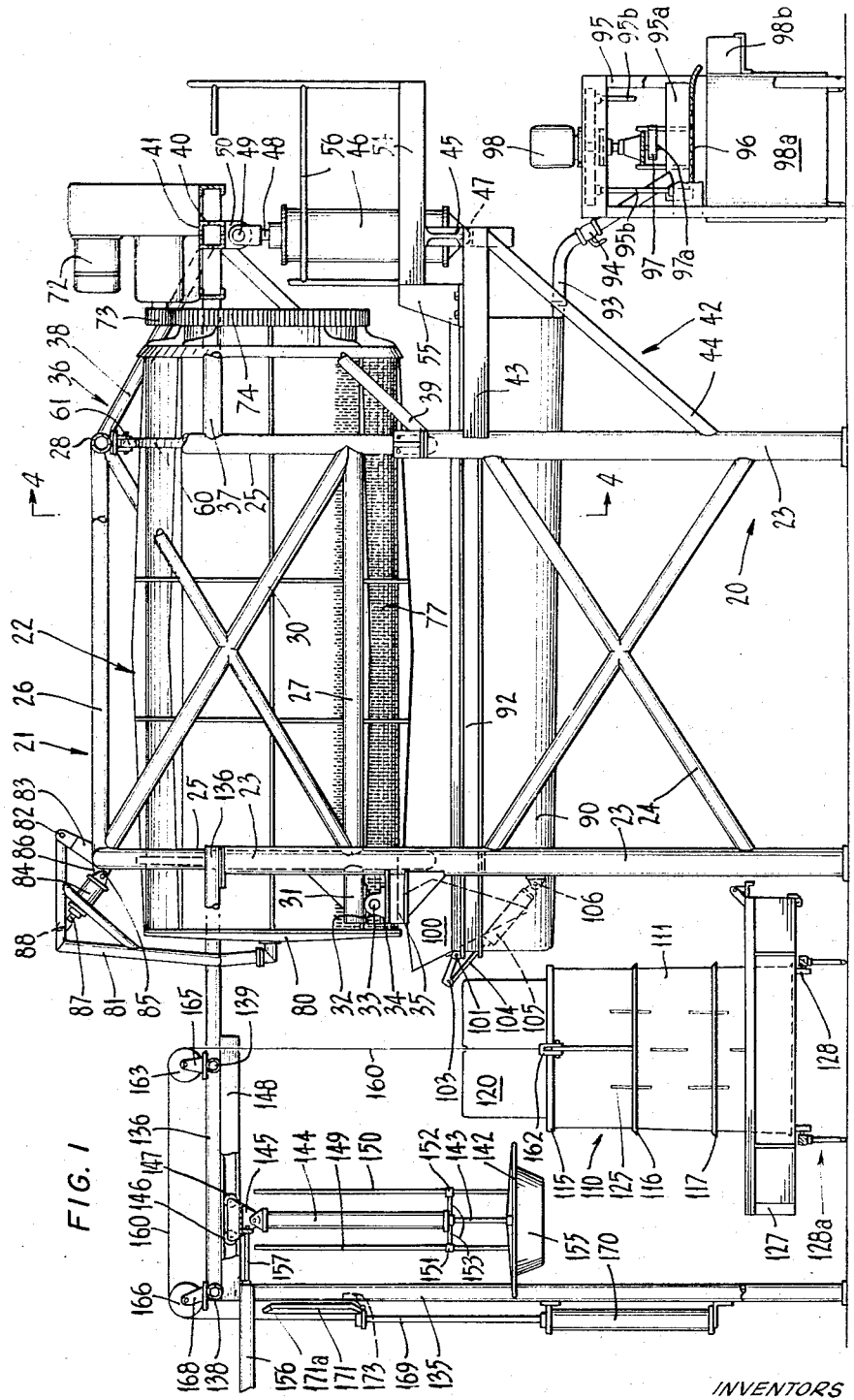
FIGURE 1 is a view in elevation of a trommel device for separating curd and whey in the process of cheese manufacture.

Referring to the drawings, in which parts have been shown broken away for convenience of illustration of a preferred embodiment of the invention, the reference numeral 20 indicates a tubular steel main frame on which the trommel frame, indicated generally at 21, is tiltably supported, the trommel, indicated generally by the numeral 22, being rotatable on the trommel frame 21.

The main frame 20 comprises four uprights 23 connected together by a cross brace 24 on one side of the frame, and by cross braces (not shown) at each end of the frame.

The trommel frame 21, which is also formed of tubular steel, comprises uprights 25, upper transverse side members 26, lower transverse side members 27, upper transverse end members 28, lower transverse end members 29, and cross braces 30 on each side of the frame. The lower side members 27 are extended beyond the uprights 25 at one end of the frame 21 to form extensions 31 and bearing members 32 are secured to the undersides of the extensions 31 and are pivotally connected by pivot pins 33 to bearing members 34 which are mounted on brackets 35 secured to the uprights 23 of the main frame 20.

The trommel frame 21, which is located inwardly of the uprights 23 of the main frame 20, is thus tiltable about the pivot pins 33.

Figure 2:
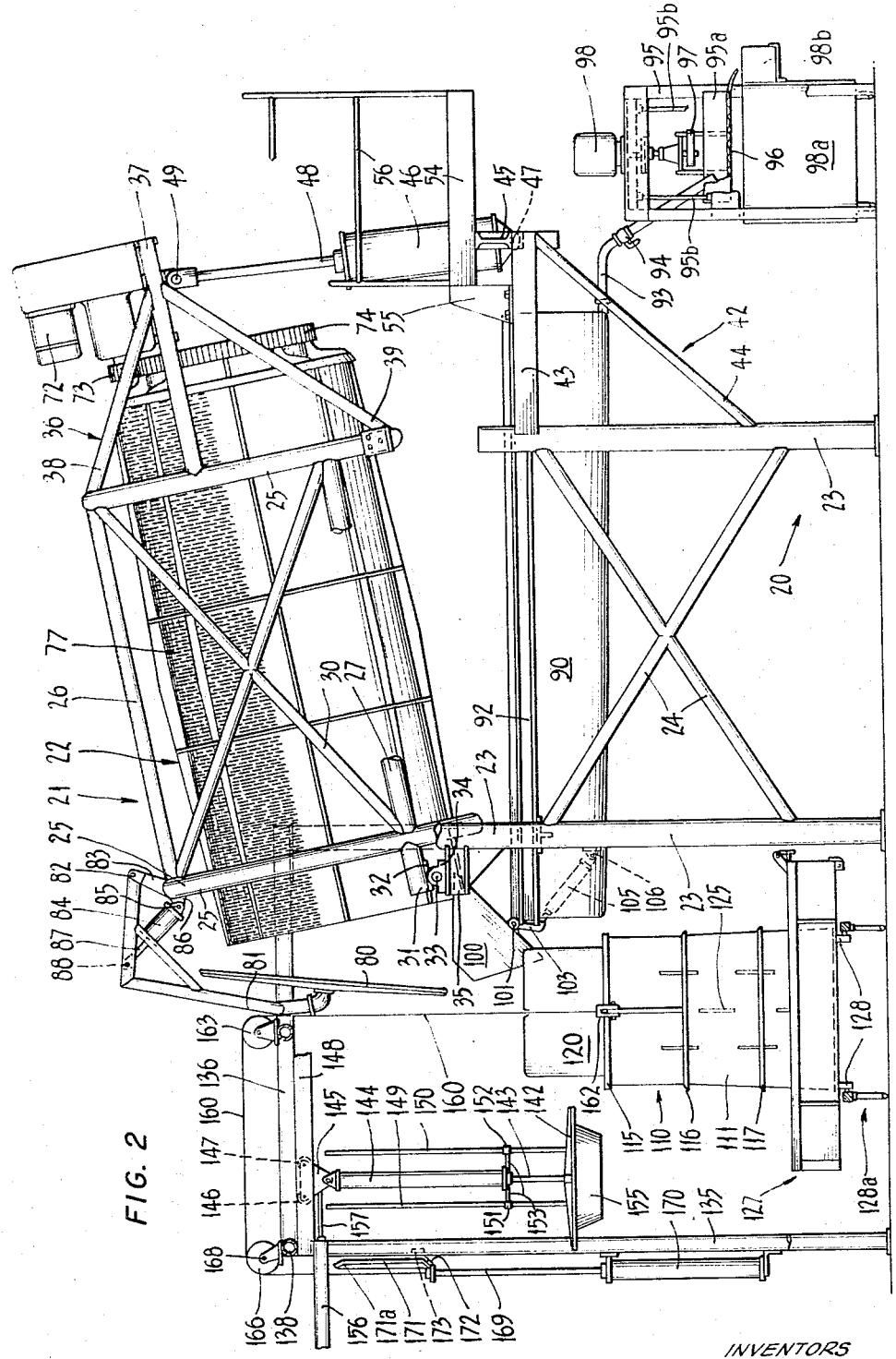
FIGURE 2 is a similar view to FIGURE 1 showing the trommel in its fully tilted position.

To enable tilting of the trommel frame 21 to be effected, the said frame 21 is provided at the end thereof remote from the pivots 33 with an auxiliary frame 36 which consists of horizontal members 37 secured to the uprights 25, upper bracing members 38 and lower bracing members 39, the meeting ends of which are secured together and to opposite sides of a transverse member 40 on which a platform 41 is mounted. Another auxiliary frame 42 is secured to the main frame 20 beneath the auxiliary frame 36 and the frame 42 comprises horizontal members 43 secured to the uprights 25, bracing members 44, and a downwardly dished transverse member 45. An air cylinder 46 is pivoted at its lower end to a bearing 47 on the transverse member 45 and the piston 48 of the air cylinder is pivoted at 49 to a bearing 50 secured to the underside of the transverse member 40. When compressed air is admitted to the air cylinder 46 the piston 48 is raised and the trommel frame 21 and trommel 22 are tilted about the pivots 33, as shown in FIGURE 2. A safety device (not shown) is provided to support the trommel frame 21 in the event of failure of the tilting mechanism described above.

An observation platform 54 is secured to and supported by brackets 55 secured to the horizontal members 43 and by the transverse member 45, and guard rails 56 are provided on the platform 54.

The trommel 22 is rotatably supported in the trommel frame 21 by means of circumferential rings 60 which are secured to the periphery of the trommel near each end thereof and which engage rollers 61, 62 and 63 rotatably mounted on the trommel frame (FIGURE 4). The rollers 61 are rotatably mounted on brackets 64 secured to the upper transverse members 28, and the rollers 62, 63 are rotatably mounted on brackets 65, 66 attached to flanges 67, 68 secured to the uprights 25 and lower transverse members 29. The periphery of each roller 62, 63 is flanged so as to engage the sides of the rings 60, thus preventing longitudinal movement of the trommel 22 in the trommel frame 21, for example, when the latter is tilted.

Rotation is imparted to the trommel 22 by a variable speed electric motor 72 which drives a pinion 73 which in turn drives a gear wheel 74 which is mounted on the entry end of the trommel 22. The gears are enclosed in a housing (not shown). The electric motor 72 is supported on the platform 41 and is controlled by a suitable automatic switching mechanism (not shown).

The trommel 22 comprises a cylindrical stainless steel drum which is partially closed at its entry end by an annular plate 75 and is provided with a central entry aperture 76 through which a mixture of curd granules and whey is charged into the trommel through pipe 79 at the commencement of each cycle of operations (FIGURE 5). The mixture of curd granules and whey is pumped from the vats in which the normal procedure of curd formation has been carried out.

In the embodiment illustrated in the drawing, the trommel is imperforate over two-thirds of its peripheral area and is perforated over the remaining one-third of its peripheral area. The trommel thereby is provided with a generally axially extending imperforate segment and with a generally axially extending perforate segment. The perforations comprise a series of rows of slots 77 (FIGURE 6), the said slots being disposed so as to extend in a peripheral or circumferential direction. The width of each slot is sufficient to permit whey to drain therethrough but is not sufficient to permit curd granules or particles to pass through or to block the slot, except for small quantities of fine particles which may pass through. This arrangement of slots has been found to effect efficient separation of whey from the curd granules, and a minimum discharge of fines with the whey from the trommel. The width of each slot is about .065 inch, the length of each slot is about one inch, and the ends of the slots are preferably rounded.

The slots are spaced relatively close together to permit maximum drainage and preferably the slots in each row are disposed opposite to the spaces between slots in the adjacent rows. The peripheral distance between adjacent slots is about .25 inch and the axial distance between rows of slots of about .12 inch.

Lifting spaced apart parallel rods or bars 78 (preferably sixteen in number) are mounted within the trommel and are disposed to extend from end to end thereof in a helical direction, the angle of inclination of each rod 78 to the axis of the trommel being about 15°. Each rod 78 is secured to the internal surface of the trommel by suitable means and is spaced from said internal wall by a relatively short distance. The lifting rods 78 serve to lift the curd granules when the trommel 22 is rotated and also serve to facilitate separation of the curd and whey, and the drainage of the whey through the slots 77. Fingers (not shown) may be provided on the rods 78, or on some of such rods, for the purpose of assisting the prevention of formation of lumps in the curd.

The discharge end of the trommel 22 is normally closed by a door 80 which is secured to a frame 81 which is pivoted at pivot points 82 to brackets 83 secured to the transverse end member 28 of the trommel frame 21. An air cylinder 84 is pivoted at 85 to a bracket 86 secured to the end member 28 of the trommel frame 21 and the piston 87 of the air cylinder 84 is pivoted at 88 to the frame 81. Actuation of the piston 87 by the air cylinder 84 effects opening or closing of the discharge end of the trommel 22 by the door 80, and this opening and closing movement is automatically controlled in accordance with a predetermined cycle.

A whey receiving tray 90 which is of inverted D-shape in endwise cross section is supported on brackets 91 secured to the uprights 23 of the main frame (FIGURE 4). The tray 90 is disposed beneath the trommel 22 and is of greater length and width than such trommel so that the whey which drains through the slots 77 in the trommel is received in the tray 90. The tray 90 is provided with a channel-shaped peripheral surround or flanged member 92 which rests on the brackets 91 and also serves to strengthen the tray 90. The whey from the tray 90 is discharged through pipe 93 and valve 94 to mechanism for separating from the whey any curd fines which have passed through the slots 77 with the whey.

The mechanism for separating the fines from the whey comprises a frame 95 on which a subframe 95a is supported by means of suspension rods 95b having rubber mountings so that the sub-frame 95a is capable of vibration. A sieve 96 is mounted on the sub-frame and the mixture of whey and fines is delivered onto the sieve 96 through the pipe 93. Vibration is imparted to the sieve by an eccentric 97 connected to a vertical shaft 97a which is rotated through a flexible coupling by the electric motor 98 mounted on the frame 95. The whey passes through the sieve and is received in the tank 98a. The fines are separated from the whey by the vibratory sieve 96 and are delivered from the sieve into the receptacle 98b. The fines are added to the curd granules in the fusing tower 110.

A discharge chute 100 is secured to a shaft 101 (see FIGURE 3) which is rotatably supported on bearing 102 mounted on the flange 92 of the tray 90. An arm 103 is secured to the end of the shaft 101 and is actuated by the piston 104 of an air cylinder 105 which is pivoted to a bracket 106 secured to one of the uprights 23 of the main frame 20. The air cylinder 105 serves to move the chute 100 from its operative position as shown in FIGURE 2 in which it serves to guide the curd granules from the discharge end of the trommel 22 into the upper end of the conditioning tower 110, to its inoperative position as shown in FIGURE 1 wherein the trommel is closed by the door 80. Movement of the chute 100 to its inoperative position enables the conditioning tower 110 to be raised without fouling said chute.

In operation, the trommel 22, which is shown in its operative position in FIGURE 1, is rotated by means of the electric motor 72 in accordance with a predetermined cycle while the mixture of curd granules and whey is delivered into the trommel through the aperture 76 by means of pipe 79.

Preferably the cycle of operation of the trommel 22 is as follows. The trommel 22 is moved to a position in which the imperforate segment of the trommel is lowermost and the slots 77 are uppermost and the mixture of curd and whey is delivered into the trommel while it is stationary in this position. When the level of whey in the trommel 22 reaches a predetermined level, the trommel is rotated through one revolution at slow speed, preferably about 2¼ revolutions per minute, to effect drainage of whey through the slots 77, delivery of the curd-whey mixture to the trommel being continued during rotation of the trommel. The trommel is then held stationary again for a period, and when the whey level again reaches the predetermined level the trommel is again rotated one revolution. This procedure is repeated four times during the filling operation. When delivery of the curd-whey mixture to the trommel has been completed, the trommel 22 is rotated one-half turn to bring the slots 77 into the lowermost position. Drainage of whey through the slots 77 is then effected for about one minute. The trommel is rotated one revolution, at slow speed, followed by drainage for one minute, and this procedure repeated at least once.

It will be understood that the rate of separation of whey from the curd varies from one batch to another, and is dependent on the nature of the milk product from which the curd is formed and on the seasonal conditions, and consequently it may be necessary for the cycle of operations of the trommel to be varied according to the characteristics of the particular material being treated. Thus, the number of revolutions of the trommel, and the period of drainage of whey between successive revolutions, may be varied.

After separation of the whey from the curd and drainage of the whey from the trommel 22 into the tray 90 have been completed, the trommel is tilted by means of the air cylinder 46 to the position shown in FIGURE 2, the chute 100 is moved by the air cylinder 105 to the operative position as shown in FIGURE 2 and the door 80 is moved away from the discharge end of the trommel 22 by the air cylinder 84. The curd granules are then discharged from the trommel 22 through the chute 100 into the conditioning tower 110, the trommel 22 being rotated at higher speed (e.g. about 9 revolutions per minute) during the discharge operation to facilitate discharge of the curd granules from the trommel.

When the curd granules have been discharged from the trommel 22, the trommel is returned to the horizontal position shown in FIGURE 1, the door 80 is returned to close the discharge end of the trommel, the chute 100 is returned to its inoperative position, and the filling cycle is recommenced.

Figure 3:
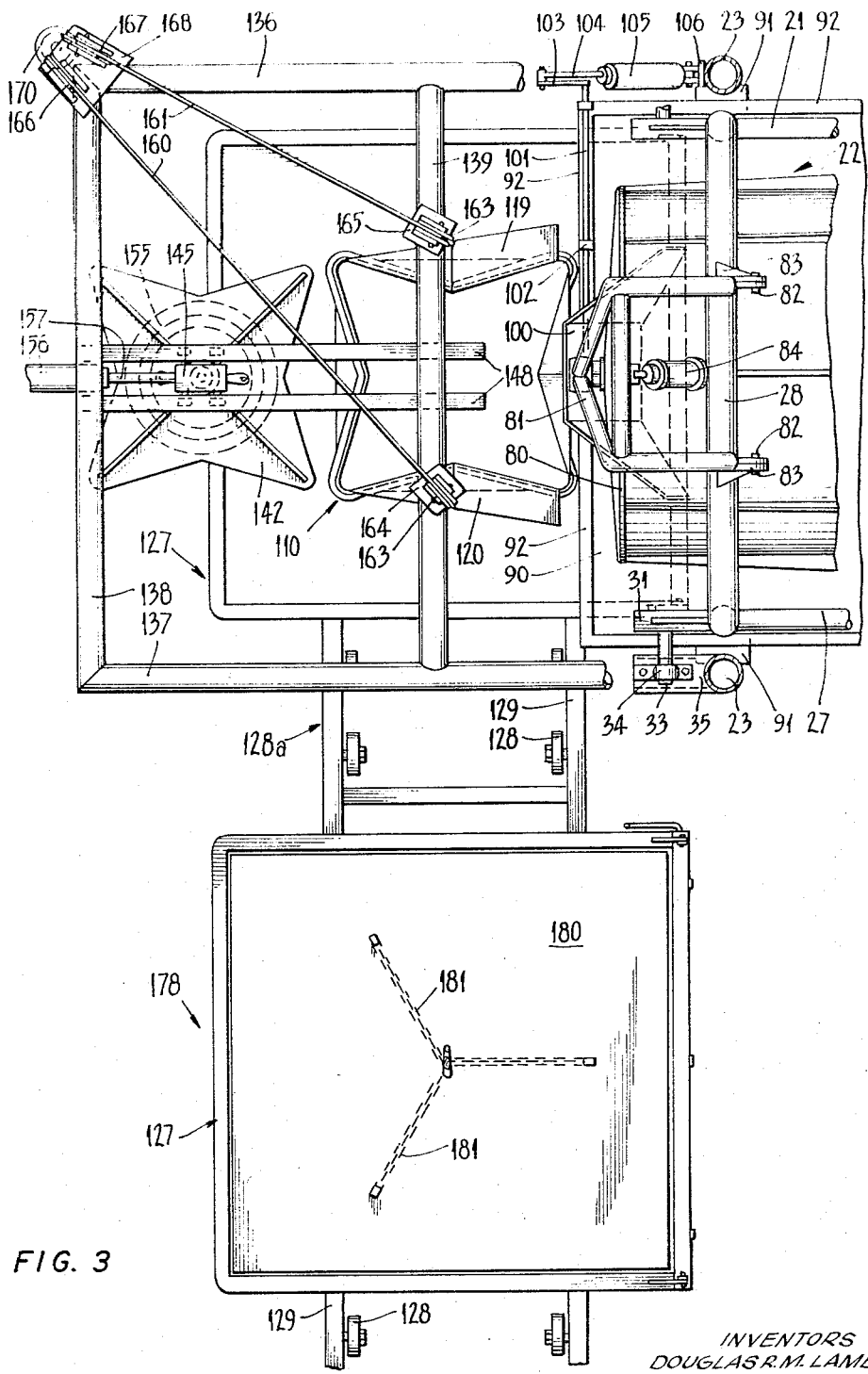
FIGURE 3 is a plan view of an enlarged scale, of the discharge end of the trommel and of the fusing tower.

The apparatus for agglomerating the curd particles and for conditioning the agglomerated curd as illustrated in FIGURES 1, 2 and 3 of the accompanying drawings, will now be briefly described.

The conditioning tower 110 is star-shaped in cross-section as shown in FIGURE 3, and is provided with vertical slots 125 for drainage of whey, horizontal strengthening flanges 115, 116, 117 and guide plates 119, 120. The tower 110 is open at its upper and lower ends and its lower end rests on the floor of a square forming tray 127 which in turn rests on a roller conveyor 128a. The conveyor 128a comprises frame members 129 and rollers 128.

A frame is provided on which is mounted the mechanism for raising and lowering the conditioning tower 110 and the mechanism for compressing the curd in the tower 110. This frame comprises uprights 135, upper longitudinal members 136, 137 and upper transverse members 138, 139.

A pressure plate 142 is secured to the lower end of a piston 143 mounted in an air cylinder 144, the upper end of which is pivoted to a carriage 145 having rollers 146, 147 which travel horizontally in guide tracks 148 which are secured to the transverse frame members 138, 139. An air cylinder 156 having a piston 157 which is connected to the carriage 145 is provided for moving the carriage 145, and with it the pressure plate 142, between the inoperative position shown in FIGURES 1 and 2 and the operative position in which the pressure plate 142 is disposed in vertical alignment with the conditioning tower 110.

The pressure plate 142 is maintained in a horizontal position during its vertical movement, by guide rods 149, 150 which are vertically slidable in bushes 151, 152 secured to the ends of arms 153 which extend laterally from and are secured to the lower end of the air cylinder 144, the lower ends of the guide rods 149, 150 being secured to the pressure plate 142.

A ring-shaped member 155 which is of V-shape in cross-section is secured to the lower surface of the pressure plate 142, and is caused to make an annular V-shape indentation in the curd mass when pressure is applied to said mass by the pressure plate 142.

The pressure plate 142 is of the same shape in plan as the tower 110 so as to fit neatly therewithin.

The tower 110 is raised and lowered by means of cables 160, 161, the ends of which are secured to brackets 612 secured to the side walls 111 of the tower 110. The cables 160, 161 pass upwardly from the brackets 162 and around pulleys 163 which are rotatably mounted on brackets 164, 165 secured to the transverse member 139. The cables 160, 161 then pass around pulleys 166, 167 mounted on the bracket 168 which is supported on and secured to the longitudinal frame member 136 and transverse frame member 138 at one corner of the supporting frame.

The cables 160, 161 after passing around the pulleys 166, 167 extend downwardly and are connected to the upper end of a piston 169 of an air cylinder 170 which is secured to the upright 145 of the supporting frame.

A cam 171 is secured at its lower end to the upper end of the piston 169 and is adapted to engage an arm 172 of a micro switch 173 mounted on the upright 135. The cam 171 is shaped so as to actuate the arm 172 of the micro switch 173 in order to effect raising of the conditioning tower 110 according to a predetermined cycle.

The micro switch 173 controls a spool valve (not shown) which regulates the flow of air to the air cylinder 170. When the arm 172 engages the inclined portions 171' of the cam 171, the flow of air to the air cylinder 170 is unrestricted and the conditioning tower 110 is raised at the maximum rate. When the arm 172 engages the central part of the cam 171, the spool valve which restricts the flow of air to the air cylinder 170 is actuated and the rate of lifting of the conditioning tower 110 is reduced.

The raising of the tower 110 is controlled by the cam 171 and microswitch 173 so as to effect a slow lateral spreading of the curd towards the side walls of the tray 127 as the curd is removed from the lower end of the conditioning tower 110. The tower 110 is raised according to a predetermined lifting cycle. If the raising of the tower 110 is carried out too quickly, the curd mass tends to disintegrate, whereas if it is done too slowly there is a tendency for the curd to stick to the walls of the tower 110 with consequent tearing of the curd.

As the tower 110 is raised, the curd is progressively removed from the lower end of the tower and at the same time spreads laterally outwards toward the side walls of the tray 127.

When the tower 110 has been fully raised the lower end of said tower is free from the upper surface of the curd and the mass of curd has spread into an approximately pyramidal shape. The lower portion of the curd mass is caused to flow laterally toward the side walls of the tray 127 and to contact said walls substantially uniformly therealong.

The recess which is formed in the upper surface of the curd by the V-shaped ring 155 ensures that the curd will spread evenly so as to substantially fill the tray 127 without causing uneven deformation or disintegration of the upper surface of the curd mass.

After the fusing tower 110 has been fully raised from the curd mass, the tray 127 containing the curd mass is moved laterally on the rollers 128 to the position indicated by the numeral 178 in FIGURE 3, at which point the tray 127 is located beneath a heated pressure plate 180. The heated pressure plate 180 is suspended by chains 181, and is of substantial weight and is electrically heated and thermostatically maintained at a predetermined temperature, preferably about 106° F. When the pressure plate 180 is lowered it contacts the upper surface of the curd mass in the tray 127 and encourages the further lateral flow of curd to the tray boundaries. The pressure plate 180 is lowered intermittently according to a predetermined cycle, and when it is in its lowermost position the curd mass has been caused to spread laterally in a controlled manner so as to substantially fill the tray 127, and the pressure plate 180 is then raised and the filled tray is moved to the next station (not shown) on the roller conveyor 128'.

Each tray 127 is moved automatically through a series of stations on the roller conveyor over a predetermined period. During this period further fibre development or cheddaring of the cheese curd takes place and in addition the acidity of the curd develops to the required degree.

After the curd has passed through the various stations and cheddaring has been completed, the curd is subjected to subdivision and is then salted and hooped or packed, by mechanism which it is not necessary to described or illustrate in this specification.

What is claimed is:

1. An apparatus for separating cheese curd and whey comprising, a frame, a rotatable hollow generally cylindrical trommel having a peripheral wall, an inlet end and a discharge end pivotably mounted on said frame adjacent said discharge end, motor means for rotating said trommel, means for pivoting said trommel, means for delivering a mixture of curd granules and whey into the inlet end of said trommel and means for discharging said granules from the discharge end of said trommel, a plurality of paralled spaced apart helically extending rod-like lifting members mounted in the interior of said trommel in spaced relationship to the inner surface of said peripheral wall, said peripheral wall of said trommel having an axially extending perforate segment and an axially extending imperforate segment, said perforate segment including about one-third of said peripheral wall, said perforate segment being formed by a plurality of elongated circumferentially extending slots disposed in axial rows in said peripheral wall, said slots having a width less than the minimum diameter of the cheese curd granules excluding fines, and having a length substantially greater than the maximum diameter of the cheese curd granules.

2. An apparatus for separating cheese curd and whey comprising, a frame, a rotatable hollow generally cylindrical trommel having a peripheral wall, an inlet end and a discharge end pivotably mounted on said frame adjacent said discharge end, motor means for rotating said trommel, means for pivoting said trommel, means for delivering a mixture of curd granules and whey into one end of said trommel and means for discharging said granules from the other end of said trommel, a plurality of helically extending lifting members mounted in the interior of said trommel in spaced relationship to the inner surface of said peripheral wall, said peripheral wall of said trommel having an axially extending perforate segment and an axially extending imperforate segment, said perforate segment including about one-third of said peripheral wall, said perforate segment being formed by a plurality of elongated circumferentially extending slots disposed in axial rows in said peripheral wall, said slots having a width less than the minimum diameter of the cheese curd granules excluding fines, and having a length substantially greater than the maximum diameter of the cheese curd granules, a whey receptacle disposed beneath said trommel for receiving whey and cheese curd fines which pass out of the trommel through said slots in said perforate segment, and means associated with said receptacle for separating the cheese curd fines from the whey.

3. An apparatus for separating cheese curd and whey comprising, a main frame, a trommel frame pivotably mounted on said main frame, a rotatable hollow generally cylindrical trommel having a peripheral wall, an inlet end and a discharge end fixedly mounted on said trommel frame, said trommel frame being pivotable about a point adjacent said discharge end, a pivotable door for said discharge end of said trommel, means for pivoting said door between a closed position and an open position, motor means for rotating said trommel, means for pivoting said trommel, means for delivering a mixture of curd granules and whey into one end of said trommel and means for discharging said granules from the other end of said trommel, a plurality of helically extending lifting members mounted in the interior of said trommel in spaced relationship to the inner surface of said peripheral wall, said peripheral wall of said trommel having an axially extending perforate segment and an axially extending imperforate segment, said perforate segment including about one-third of said peripheral wall, said perforate segment being formed by a plurality of elongated circumferentially extending slots disposed in axial rows in said peripheral wall, said slots having a width less than the minimum diameter of the cheese curd granules excluding fines, and having a length substantially greater than the maximum diameter of the cheese curd granules, a whey receptacle disposed beneath said trommel for receiving whey which drains out of the trommel, and means associated with said receptacle for separating cheese curd fines from the whey.

References Cited by the Examiner

UNITED STATES PATENTS

| | | | |
|---|---|---|---|
| 1,470,463 | 10/1923 | Manning | 210—403 X |
| 1,998,635 | 4/1935 | Paris | 259—171 |
| 2,255,028 | 9/1941 | Long | 68—12 |
| 2,520,718 | 8/1950 | Hanson | 210—403 X |
| 2,536,054 | 1/1951 | Harrington | 31—48 |
| 2,544,672 | 3/1951 | Greer et al. | 99—116 |
| 3,021,122 | 2/1962 | Maxon | 259—171 |
| 3,080,152 | 3/1963 | Lendved | 259—171 |

ALDRICH F. MEDBERY, *Acting Primary Examiner.*